UNITED STATES PATENT OFFICE.

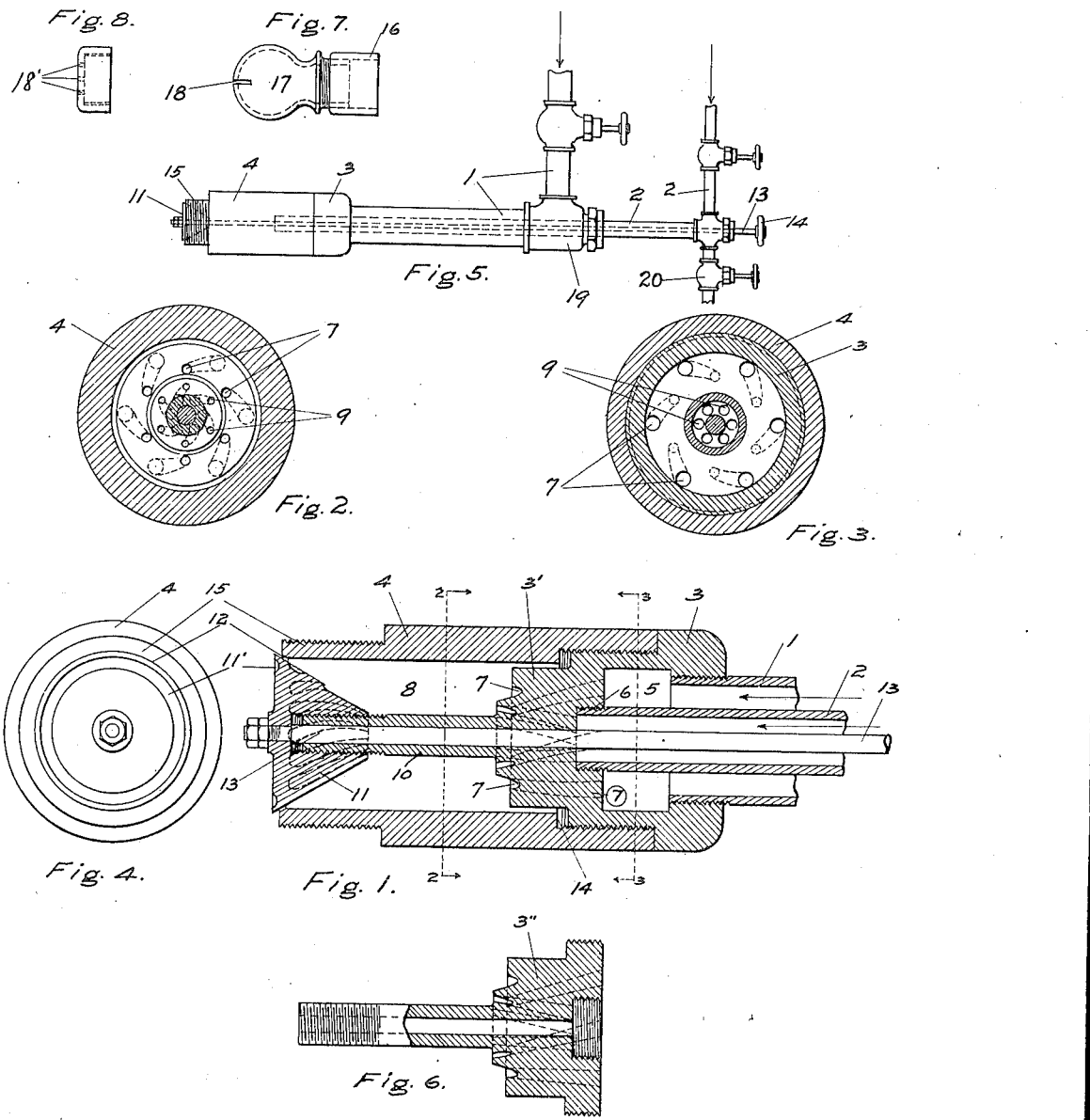

JOSEPH L. HOFFMAN, OF PORTLAND, OREGON.

OIL-BURNER.

1,087,768.  Specification of Letters Patent.  Patented Feb. 17, 1914.

Application filed December 21, 1912. Serial No. 738,000.

*To all whom it may concern:*

Be it known that I, JOSEPH L. HOFFMAN, a citizen of the United States, residing in the city of Portland, county of Multnomah, and State of Oregon, having invented certain new and useful Improvements in Oil-Burners, do hereby declare the following to be a full, clear, and exact description of one embodiment of the same.

My invention relates to oil burners and has among its salient objects to provide an improved and simplified oil burner of few parts and of such construction and arrangement that a more thorough mixing and atomizing of the fuel is obtainable, and therefore a more nearly perfect and complete combustion had; to provide in combination with an oil burner a controlling and regulating tip or element at the discharge end of the burner which is capable of being manipulated and adjusted at any time from outside of the furnace or fire box within which the burner is used, thereby making it possible to adjust the tip and change the flame at will while in use.

Other objects will appear from the following description of one practical embodiment of the invention, reference being had to the accompanying sheet of drawings illustrating the same, and in which,—

Figure 1 is a longitudinal sectional view of one embodiment of the invention; Fig. 2 is a cross sectional view taken on line 2—2 of Fig. 1; Fig. 3 is a cross sectional view taken on line 3—3, Fig. 1; Fig. 4 is an outer end view of the burner; Fig. 5 is a side elevation of a burner with connections; Fig. 6 is a sectional view of a modified form of mixing member; Fig. 7 is a side elevation of one form of tip or cap used on the outer or discharge end of the burner; and Fig. 8 is another form of cap or tip for the discharge.

Referring now to the drawings, 1 designates a steam supply pipe, 2 an oil supply pipe, and 3 a member formed as a part of a casing or burner body 4 into which pipes 1 and 2 discharge. The member 3 is constructed, as shown in Fig. 1, to receive the end of the steam supply pipe, as indicated, and also the end of the oil supply pipe 2, at a point interiorly thereof, as indicated, whereby to provide a chamber 5 into which the steam is first discharged from the pipe 1. Within the burner casing is a mixing member, which I will designate as 3', which is provided with a series of passageways 7—7 extending longitudinally therethrough, preferably tapering, and leading from the chamber 5 to a mixing chamber 8, and also with a series of similar passageways 9—9, in the middle portion thereof, also preferably made tapering, and leading from the oil supply pipe, as indicated, to the mixing chamber 8. These passageways are arranged at different angles so that steam and oil, or other fuel discharged therethrough, will collide at an angle in chamber 8, within casing 4, which is screwed on to the member 3, as indicated in Fig. 1. The member 3 and the casing 4 together form, in effect, one general burner casing or body, with the mixing member 3' interposed therein as a partition and made of sufficient length so that the passageways therethrough will give definite direction to the fuel forced therethrough. These passageways are preferably made spiral, as indicated by the dotted curved lines—passageways 7—7 being spiraled in a different direction from that of passageways 9—9, the effect being similar to the rifling in the barrel of a rifle, and adding increased mixing and atomizing force as the oil and steam collide at angles in chamber 8 under this forced torsional movement, from the smaller or restricted discharge ends of said passageways, for with the larger or receiving ends leading from the oil and steam supplies, and the smaller or discharging ends opening into chamber 8, I am able to get an increased pressure in the discharge, while I have a comparatively low pressure feed of oil and steam. This is an important feature and secures a most remarkable commingling and atomizing of the steam and oil, and a more nearly perfect combustion. The mixing member 3', in the form here shown, is also provided with a threaded stem 10, extended within chamber 8, and is adapted to receive a conical tip or element 11, adjustably mounted thereupon and constructed to form and regulate an annular opening 12 from the mixing chamber 8. This tip 11 is secured to the end of an operating rod 13, extended through the stem 10, the mixing member 3', and the oil pipe 2, and is provided upon its rearward end with an operating hand wheel 14, Fig. 5, whereby said tip can be turned on the stem 10 in the mouth of the case 4, from a rearward position at will, without putting out the fire, for the purpose of regulating the size of the annular discharge opening 12 and the amount of the mixture discharged therethrough for combustion. The conical tip 11 is provided in its outer face with an annular groove 11' for the purpose of preventing oil from the discharge opening from running down on to the face of said tip 11 and there carbonizing, the edge of the conical tip adjacent the annular opening 12 being thereby made rather sharp.

In Fig. 6 I have shown a slightly modified form of mixing member 3'', showing it as a separate member adapted to be inserted into the case 4 and against a shoulder 14 therein, while the part 3 would be screwed against it. By this construction the mixing member can be removed and interchanged for another of varying construction. In this form I have shown the passageways straight instead of spiral, although tapered.

The outer end of the burner casing 4 is reduced and threaded, as at 15, to receive any desired form of discharge nozzle or tip for shaping the flame, such, for example, as those shown in Figs. 7 and 8, the tip shown in Fig. 7 comprising a union 16, adapted to be screwed to the casing 4, and to receive tip 17 having a slot opening 18 therein for producing a flat flame. The tip shown in Fig. 8 is in the form of a cap adapted to be screwed upon the case 4 and is provided with a series of holes, as indicated in dotted lines at 18'. Such tips or caps upon the outer end of the burner case may be used when it is desired to shape the flame and to adapt the burner for different uses. When the burner is used without the detachable caps or tips, the flame is of flaring form around the regulating tip 11, which regulates the amount of the combustible mixture permitted to pass through the burner.

Referring to Fig. 5, I connect the steam pipes 1—1 to an ordinary T, 19, and provide a bushing to receive a smaller pipe 2, for the oil, as indicated in dotted lines. By extending the steam and oil pipes, one within the other, for a short distance, as shown in Fig. 5, before attaching the burner proper, the steam in the steam pipe heats the oil passing through the oil supply pipe, thus putting it in the best possible condition for atomizing with the steam as the two intersect each other, under pressure, at angles, in chamber 8.

An important feature of improvement is a construction whereby I am able to close the oil supply valve so as to shut off the oil, then close the adjustable tip 11 inwardly so as to close the outlet from the chamber 8, and then by opening an outlet or exhaust valve 20, steam can be forced through the steam pipe 1, into the burner, through the passageways 7 into chamber 8, and thence back through the openings or passageways 9, through the oil supply pipe and out through valve 20, thereby making it possible to blow all sediment or other obstructions which may have accumulated, out through the valve 20. If this is done occasionally, it will be understood that the oil pipe and oil passageways can be very easily and effectively kept cleaned by hot steam under pressure without any readjustment or work other than closing and opening the valves mentioned. I have also indicated in dotted lines, certain spirally extending grooves cut in the conical tip 11. These terminate short of the outer edge thereof and serve not only to give a spiral direction to the matter striking in them, but to catch in their enlarged outer ends any solid matters which might interfere with the discharge of the fuel through the annular opening 12.

From the foregoing, it will be seen that I have, in the first place, an extremely simple burner, a burner of very few parts, a burner which can be easily taken apart and new parts substituted, and also a burner provided with a regulating tip at its discharge end, adapted to be adjusted from outside of the fire box, at any and all times, for the purpose of reducing or increasing the amount of the combustible mixture to be discharged from the burner, and thereby making it possible to regulate the flame at will during the time in which the burner is in actual use, and also which can be adjusted to close the discharge outlet, so as to make it possible, having closed or cut off the oil supply and opened an exhaust valve, to force steam through the burner and oil supply pipe for the purpose of cleansing the same effectively and quickly. The regulation of the discharge of the combustible matter from the burner, is separate and apart from the means for regulating the admission of steam, or of oil, into the burner.

While I have shown and described one embodiment of the invention, I am aware that modifications can be made therein without departing from the spirit thereof, and I do not, therefore, limit the invention to the particular showing here made for purposes of illustration, but claim broadly all constructions covered by the hereto appended claims, broadly construed.

I claim:

1. In an oil burner, in combination, a burner body, a mixing member mounted therein and provided with tapering passageways extending longitudinally therethrough and angularly disposed relative to each other, whereby to discharge in intersecting paths, a regulating element adjustably mounted at the discharge end of said burner body to control the size of the discharge opening, and an operating rod from said regulating element and extended rearwardly for manipulation of said regulating element during the operation of the burner.

2. An oil burner comprising in combination, supply pipes arranged one within the other, a burner casing mounted upon the ends of said supply pipes, a discharging or mixing member mounted in said casing intermediate its ends and having therethrough, extending longitudinally thereof, two series of passageways diverging and converging respectively, whereby to discharge in intersecting paths, a regulating member in the outer end of said burner casing, and an operating rod from said regulating member and extending rearwardly through said burner casing and supply pipes to a convenient point for manipulation.

3. In an oil burner of the character referred to, in combination, a burner body, a member mounted therein and having therethrough, longitudinally thereof, a series of passageways for combustible matter, and provided with a stem extension to the end of the burner body, a regulating member in the outer end of said burner body and adjustably mounted upon said stem extension, and an operating rod for said regulating member extending rearwardly through said stem extension and burner body, substantially as described.

4. In an oil burner, in combination, a burner body with a chamber therein, a mixing member in said chamber with a series of passageways therethrough, and provided with a forwardly projecting threaded stem, a regulating member adjustably mounted on said threaded stem in the end of said burner body, and an operating rod passing through said burner body, said mixing member and stem and connected to said regulating member, whereby to adjust the same upon said stem, for the purpose indicated.

5. In an oil burner, a burner body, a mixing member mounted therein and provided with passageways extending longitudinally therethrough and angularly disposed relative to each other, whereby to discharge in intersecting paths, a regulating element adjustably mounted in the discharge opening of said burner body to control the size of said opening, and an operating rod from said regulating element and extended rearwardly for manipulation of said element during the operation of the burner.

In witness whereof, I have hereunto set my hand at Portland, Multnomah county, Oregon, this 14th day of December, 1912.

JOSEPH L. HOFFMAN.

In presence of—
G. A. NICHOLS,
A. G. FROST.